(12) United States Patent
Elson

(10) Patent No.: US 6,216,122 B1
(45) Date of Patent: *Apr. 10, 2001

(54) ELECTRONIC MAIL INDEXING FOLDER HAVING A SEARCH SCOPE AND INTERVAL

(75) Inventor: Shawn Elson, San Francisco, CA (US)

(73) Assignee: Netscape Communications Corporation, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,653

(22) Filed: Nov. 19, 1997

(51) Int. Cl.[7] .................................................... G06F 17/30

(52) U.S. Cl. ................................. 707/3; 707/104; 707/5; 707/10; 345/335; 709/206; 709/217

(58) Field of Search ..................... 707/1–10, 100–104, 707/200, 201, 202, 203, 204, 206, 516, 521, 205; 706/45–47; 709/203–207, 217; 345/335

(56) References Cited

U.S. PATENT DOCUMENTS

| | | | | |
|---|---|---|---|---|
| 5,406,557 | * | 4/1995 | Baudoin ................................. | 370/61 |
| 5,627,764 | * | 5/1997 | Schutzman et al. .................. | 709/207 |
| 5,765,170 | * | 6/1998 | Morikawa ............................. | 707/200 |
| 5,813,009 | * | 9/1998 | Johnson et al. ...................... | 707/100 |
| 5,819,261 | * | 10/1998 | Takahashi et al. ........................ | 707/3 |
| 5,826,269 | * | 5/1999 | Hussey ................................... | 707/10 |
| 5,899,995 | * | 5/1999 | Millier et al. ........................ | 707/102 |

OTHER PUBLICATIONS

Denis Haskin, Sending out the search party for exchange, IT/IS BackOfice Magazine, and 1–6, Sep. 1996.*

Bethaney, Herb, search utility will pick up where exchange leaves off. (Fulcrum technologies fulcrum find add–on the microsoft exchange messaging system), PC week, v13, n13, and p91, Apr. 1996.*

Business wire, Fulcrum tech: fulcrum launches fulcrum find! For microsoft exchange server; fulcrum's first "Shrink–Wrapped" product allows instantaneous searching of public folders, greatly infreases productivity of microsoft exchange server–based applic, Mar. 1996.*

Business wire, Fulcrum find! To allow web users to reach into microsoft exchange exchange users to reach out to web and beyond, Jun. 1996.*

* cited by examiner

Primary Examiner—Jack Choules
Assistant Examiner—Srirama Channavajjala
(74) Attorney, Agent, or Firm—Michael A. Glenn

(57) ABSTRACT

An electronic mail (e-mail) search folder device utilizing an easily configurable search system that allows the user to associate attributes to a folder and will automatically search and organize the user's e-mail messages. Search attributes that are specified by the user are associated with a file folder by the invention. Search strings and properties, the frequency of the search, and the scope of the search are designated by the user. The invention waits for the specified interval or event condition to become true and performs the search across the folders and objects specified by the user. The invention inserts pointers to the e-mail messages that were found to match the search criteria into the search folder which is always available to the user. The invention thereby provides a flexible, automatic tool for e-mail message organization that does not require users to remember the absolute paths, or locations of messages and provides an e-mail search folder device that is active either upon receipt or after receipt of the user's e-mail.

16 Claims, 5 Drawing Sheets

ELECTRONIC MAIL INDEXING FOLDER HAVING A SEARCH SCOPE AND INTERVAL

BACKGROUND OF THE INVENTION

1. Technical Field

The invention relates to the organization and sorting of electronic mail in a computer environment. More particularly, the invention relates to the organization and retrieval of electronic mail via an automatic search mechanism that requires minimal additional storage and interaction by the user.

2. Description of the Prior Art

The popularity of electronic mail (e-mail) has grown dramatically in recent years. This growth has increased the complexity of the user's ability to manage the e-mail that he receives. The expanding volume and uses of e-mail require the user to become more organized. Typically, e-mail messages have an absolute location in most e-mail products. The e-mail messages normally reside in specific folders. Users often create a complex organization of folders to handle the large amount of e-mail they receive.

The user will typically file a message in a folder or sub-folder. The location of the message may later be forgotten by the user, resulting in messages that are essentially lost.

One solution to this problem of lost messages is a search utility that is provided by many e-mail products. These search utilities come in the form of a single search dialog. Users search for messages based on the attributes of a message. For example, the user remembers who sent him an e-mail and uses the search utility to search through all of the "From:" fields of his e-mail messages. The search can be conducted across all folders, allowing the user to find the desired message regardless of the absolute location of that message.

However, searching for messages in a search dialog can be inconvenient and difficult for many reasons:

Search criteria are difficult to remember. The specific criteria is easily forgotten if the user does not perform the same search regularly, thereby hampering the user's ability to consistently obtain the same search results.

Having access to a single search dialog means the user can only perform one search at a time. The user may want to retain previous search criteria and results. However, if there is only a single search dialog, the user is forced to overwrite previous searches as new searches are performed.

Entering search criteria is a tedious and time-consuming process. Search dialogues require the user to enter the search criteria each time a search is made. Specifying a search once and later modifying it when required is a more efficient way to work.

Users may want continual access to the search results without having to specify the search each time they choose to view the results.

Most mail applications require that messages have an absolute location. Messages exist in a specific folder. The user must copy the message to have the same message exist in different folders, which wastes disk space and can cause synchronization problems.

It is difficult for users to quickly change the organization of their messages to suit their needs. If the user is assigned to a new project, he may want to have a single folder containing all of the mail that he has ever received from those coworkers who are also assigned to the project. This process could take a very long time if it entails finding and moving a large number of messages.

Another solution is the mail filter. Mail filters also address the problem of receiving too many messages. Filters are a user defined set of rules or scripts which are used to organize incoming mail messages by filing them into predefined folders.

Referring to FIG. 1, a typical example of a mail filter 101 is shown. In this example, the mail filter rule is "sender contains maddux@bravos.com." The address criteria "maddux@bravos.com" 107 is entered by the user. The search rule specified is to check the sender field 103 to see if it contains 105 the address criteria 107 of the incoming message. A predefined action is initiated if the incoming mail message matches the criteria specified in the rule. The action in this example is to move the message to the folder 104 with the specified name of inbox 106. Filters are activated upon receipt of a message. Therefore, this approach is effective at handling e-mail that is just being received, but ineffective at handling mail messages that have already been received and filed.

It would be advantageous to provide an electronic mail search device that does not waste disk space by unnecessarily copying files and acts on e-mail either upon receipt or after receipt. It would further be advantageous to provide an electronic mail search device that is easily operated and maintained by users.

SUMMARY OF THE INVENTION

The invention provides an electronic mail (e-mail) search folder device. The invention utilizes an easily configurable search system that allows the user to associate attributes with a mail folder. These attributes are used to automatically search and organize the user's e-mail messages. It further provides the user with a file pointer-oriented system that requires minimal additional disk space.

Search attributes that are specified by the user are associated with a mail folder by the invention. Search strings and properties are designated by the user. For example, the user can specify the search to be on the "From", "To", or "CC" fields for a string such as "glavinE@bravos.com." The user specifies how often the search should be performed, for example: any time the folder is opened, at a timed interval, any time new mail is received, any time a message is sent, upon demand, or a combination of the above. The user also specifies the folders or objects to search, for example: all folders, local folders, remote folders, newsgroups, or calendar events.

The invention waits for the specified interval or event condition. Upon occurrence of the interval or event, the invention performs the search across the designated folders and objects specified by the user. The invention inserts pointers to the e-mail messages that were found to match the search criteria into the search folder. The search folder is always available to the user.

The invention thereby provides a flexible, automatic tool for e-mail message organization that does not require users to remember the absolute paths, or locations of messages. It also provides an e-mail search folder device that is active either upon receipt or after receipt of e-mail messages.

DETAILED DESCRIPTION OF THE INVENTION

As shown in the detailed description and drawings, the invention is embodied in an electronic mail (e-mail) search folder device that automatically searches and organizes the user's e-mail messages. A device according to the invention provides search operations executable upon either receipt or after receipt of the user's e-mail.

Figure 1:
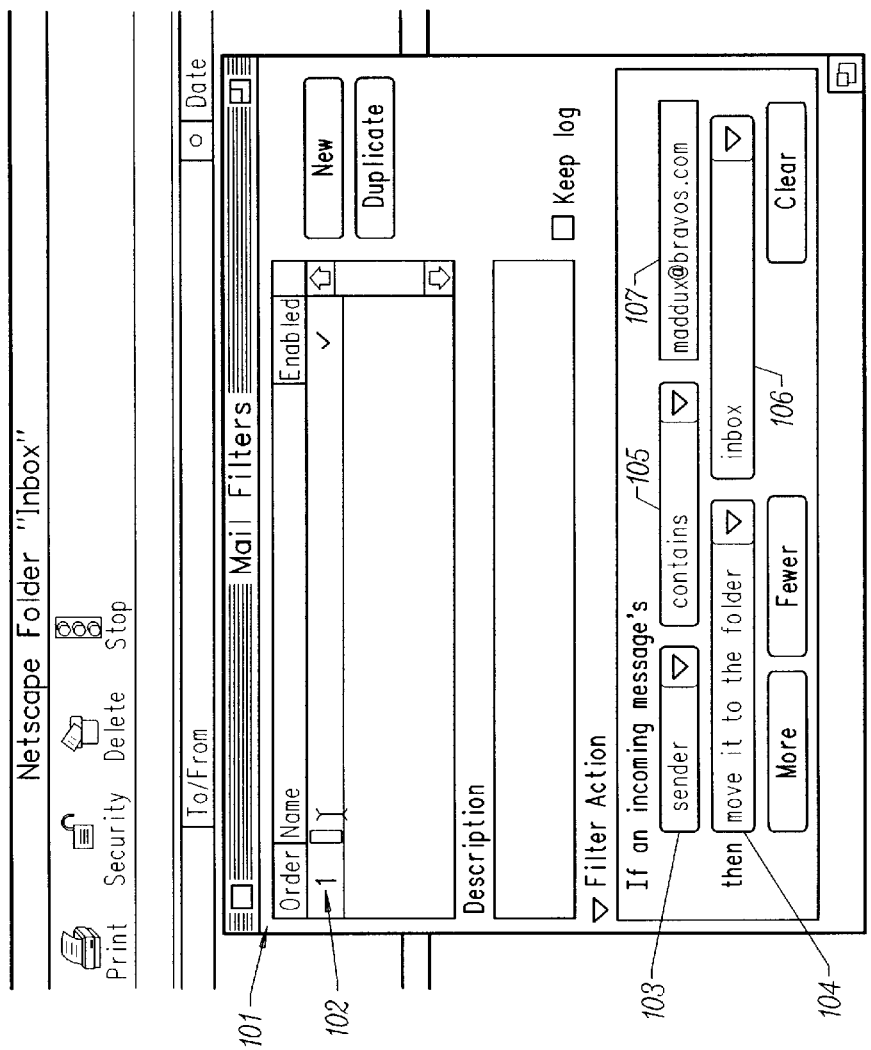
FIG. 1 is a diagram of a typical mail filter window in the prior art according to the invention.
Figure 2:
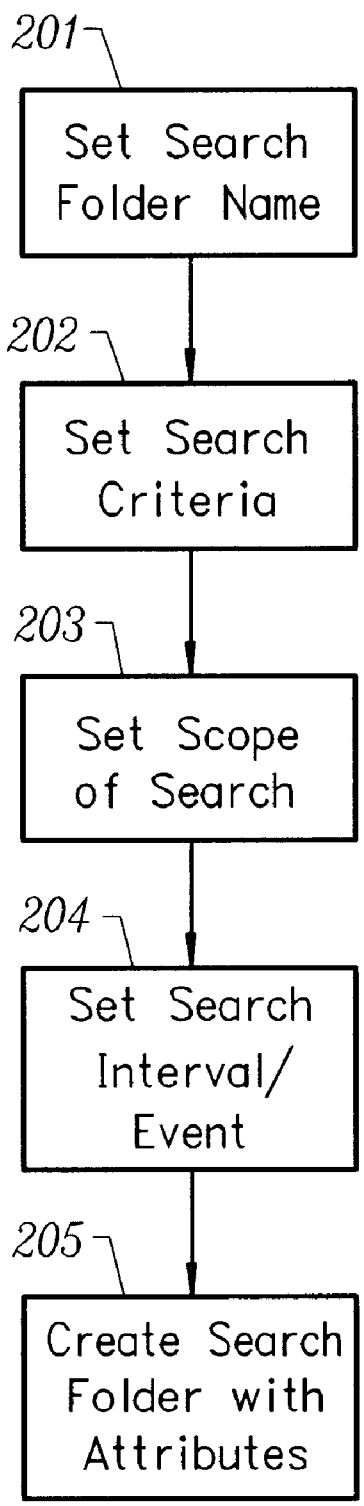
FIG. 2 is a block schematic flowchart of the search attributes that are set by the user in a preferred embodiment of the invention.

Referring to FIG. 2, in a preferred embodiment, the invention allows the user to set the search folder name 201. The user then sets the search criteria 202. The search criteria are search strings and properties. For example, the user can specify the search criteria to be on the "From", "To", or "CC" fields for a string such as "glavinE@bravos.com." The search field(s) may be a preset field, text body, or full file. Search strings consist of a text string that the user specifies. The scope of the search is then set 203. The user specifies the folders or objects to search. This covers: all folders, local folders, remote folders, newsgroups, or calendar events. The user specifies the search interval/event 204, i.e., how often or when the search should be performed. The intervals/events may be: any time the folder is opened, at a timed interval, any time new mail is received, any time a message is sent, upon demand, or a combination of the above. Finally, the invention creates the search folder, attaching the user-specified attributes 205.

Figure 3:
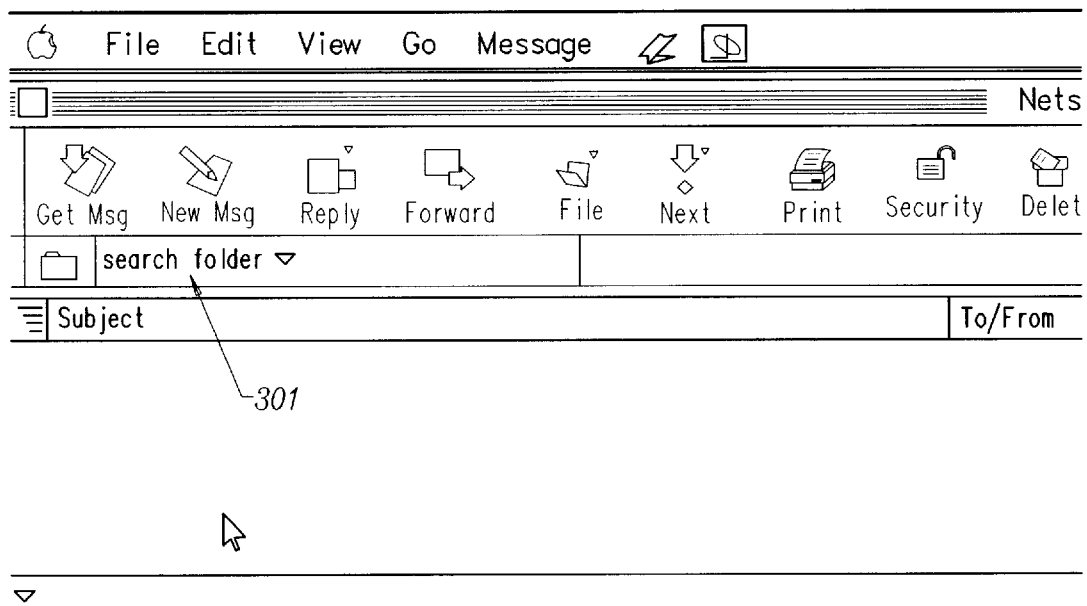
FIG. 3 is a diagram of a search folder being accessed in a browser window according to the invention.

With respect to FIG. 3, a search action may consist of simply reading the contents of the search folder in a browser 301.

Figure 4:
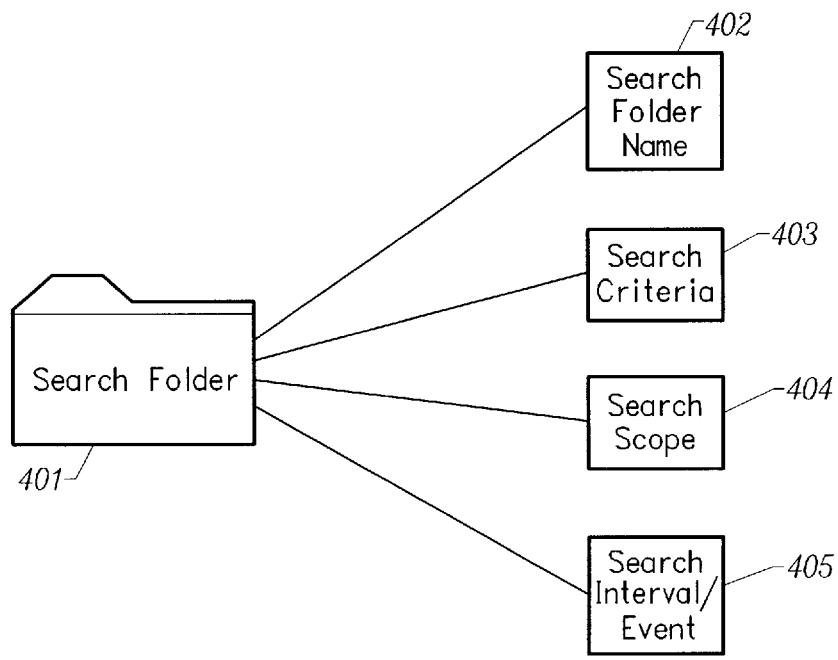
FIG. 4 is a block schematic diagram of the search attributes attached to a search folder according to the invention.

Referring to FIG. 4, as previously mentioned, the invention creates a search folder 401. The search folder 401 has search attributes associated with it such as the folder name 402, search criteria 403, search scope 404, and search interval/event 405. Each folder that is created has these properties.

Figure 5:
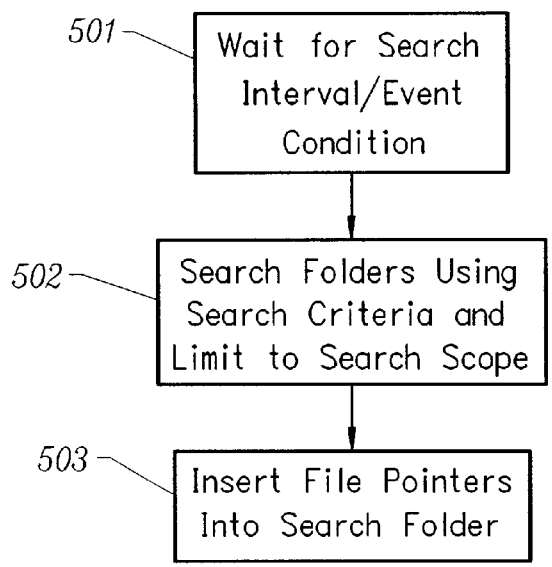
FIG. 5 is a block schematic flowchart showing the logical search operations of the invention according to the invention.

With respect to FIG. 5, the invention will then wait for the search interval/event condition 501 to become true for each search folder. Upon occurrence of the search interval/action, the invention searches the folders and objects specified by the user in the search scope 502. The invention searches the files in the specified fields or text for the search string 502. At the end of the search, the invention inserts pointers to the files that were found to have matched the search criteria into the search folder 503.

Figure 6:
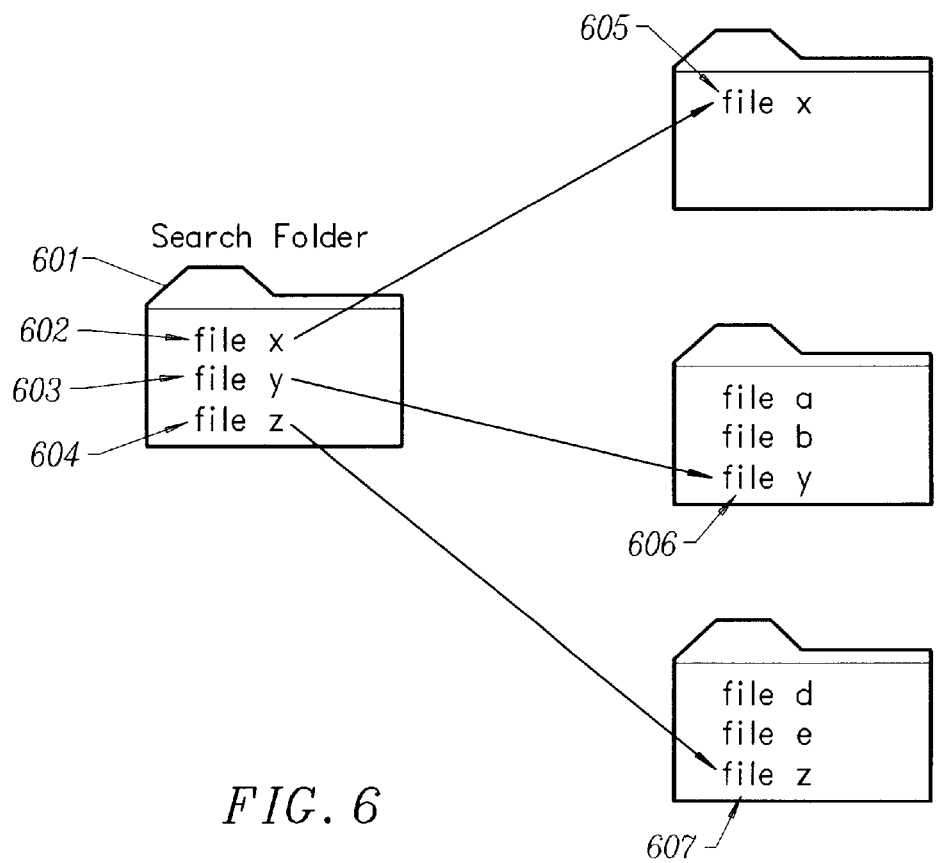
FIG. 6 is a block schematic diagram showing the file pointers in a search folder according to the invention.

Referring to FIG. 6, the search folder 601 consists of file pointers to the matching e-mail messages at the completion of the search. For example, the file pointer for e-mail message x 602, points to the location of the original e-mail message x 605. The e-mail message pointer for e-mail messages y 603 and z 604 point to the locations of the original e-mail messages y 606 and z 607, respectively.

Figure 7:
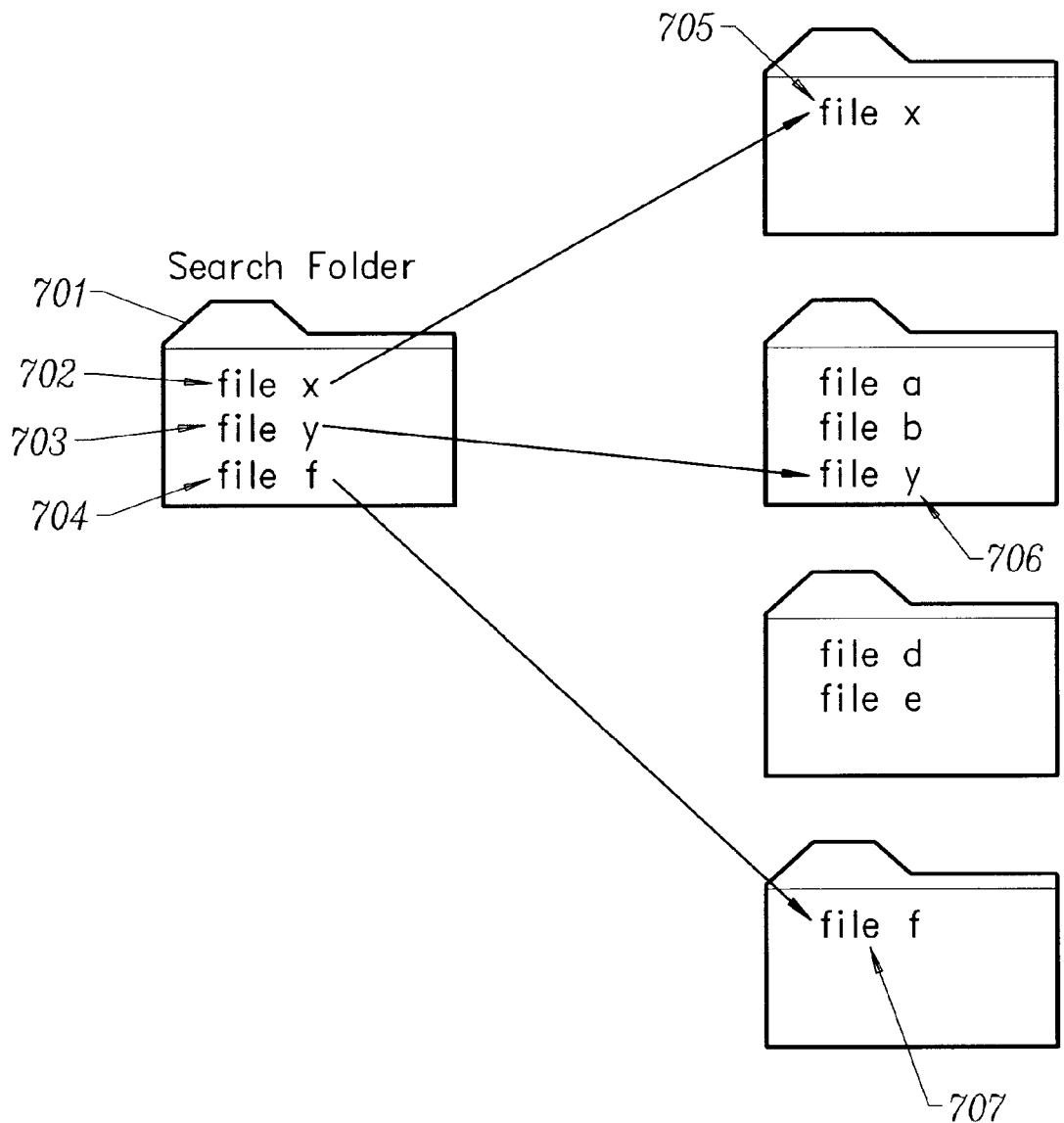
FIG. 7 is a block schematic diagram showing the file pointers in a search folder after a subsequent search interval/action according to the invention.

With respect to FIG. 7, upon occurrence of a subsequent interval/event condition, the contents of the search folder 701 may change. Here, the file consists of pointers to e-mail message x 702, e-mail message y 703, and e-mail message f 704. E-mail message z no longer exists and that fact is reflected in the search results by no longer displaying the deletion of the pointer to e-mail message z. E-mail message f is new and the pointer to e-mail message f 704 has been added to the search folder 701. The pointer to e-mail message f 704 points to the location of the original e-mail message f 707.

Although the invention is described as being applied to e-mail, one skilled in the art can readily appreciate that it can be applied to many other file types.

The invention does not have the problems that the prior art has of forcing users to move e-mail messages to specific folders, and subsequently requiring users to remember the location of said messages. The invention allows users to file messages wherever they care to. As long as a message matches the search criteria, a pointer to that message will appear in the search folder. The invention acts either upon receipt or after receipt of e-mail. Users can open a search folder at anytime without having to remember the search criteria; the results will always appear in the folder.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for organizing and retrieving electronic mail in a computer environment, comprising the steps of:

creating a search folder;

attaching search attributes to said folder;

searching for files according to said search attributes;

inserting file pointers into said folder;

wherein said attaching step attaches a search interval/event to said folder;

wherein said search interval/event indicates how often and/or when a search should be performed;

wherein said search interval/event includes but is not limited to: any time the folder is opened, at a timed interval, any time new mail is received, any time a message is sent, upon demand, or a combination of the above;

wherein said searching step waits for said search internal/event to occur;

wherein upon occurrence of said search interval/event, said searching step begins a search;

wherein said attaching step attaches a search scope to said folder;

said search scope specifies the folders and/or objects to search;

wherein said search scope includes, but is not limited to: all folders, local folders, remote folders, newsgroups, and calendar events; and wherein said searching step searches the folders and/or objects specified in said search scope.

2. The process of claim 1, wherein said attaching step attaches a folder name to said folder.

3. The process of claim 1, wherein said attaching step attaches search criteria to said folder.

4. The process of claim 3, wherein said search criteria specifies a search field.

5. The process of claim 3, wherein said search criteria specifies a search string.

6. The process of claim 1, wherein said searching step searches for e-mail messages matching said search attributes.

7. The process of claim 6, wherein said searching step limits its search to said search scope.

8. The process of claim 1, wherein said inserting step inserts pointers to files into said folder which match said search attributes.

9. An apparatus for organizing and retrieving electronic mail in a computer environment, comprising:

a module for creating a search folder;

a module for attaching search attributes to said folder;

a module for searching for files according to said search attributes;

a module for inserting file pointers into said folder;

wherein said attaching module attaches a search interval/event to said folder;

wherein said search interval/event indicates how often and/or when a search should be performed;

wherein said search interval/event includes but is not limited to: any time the folder is opened, at a timed interval, any time new mail is received, any time a message is sent, upon demand, or a combination of the above;

wherein said searching module waits for said search interval/event to occur;

wherein upon occurrence of said search interval/event, said searching step begins a search;

wherein said attaching module attaches a search scope to said folder;

said search scope specifies the folders and/or objects to search;

wherein said search scope includes, but is not limited to: all folders, local folders, remote folders, newsgroups, and calendar events; and wherein said searching module searches the folders and/or objects specified in said search scope.

10. The apparatus of claim 9, wherein said attaching module attaches a folder name to said folder.

11. The apparatus of claim 9, wherein said attaching module attaches search criteria to said folder.

12. The apparatus of claim 11, wherein said search criteria specifies a search field.

13. The apparatus of claim 11, wherein said search criteria specifies a search string.

14. The apparatus of claim 9, wherein said searching module searches for files matching said search attributes.

15. The apparatus of claim 13, wherein said searching module limits its search to said search scope.

16. The apparatus of claim 9, wherein said inserting module inserts pointers to files into said folder which meeting said search attributes.

* * * * *